(12) United States Patent
Veittinger

(10) Patent No.: US 9,314,891 B2
(45) Date of Patent: Apr. 19, 2016

(54) MACHINING UNIT FOR A PROGRAM-CONTROLLED MACHINE TOOL

(71) Applicant: DECKEL MAHO PFRONTEN GmbH, Pfronten (DE)

(72) Inventor: Hans Veittinger, Waltenhofen (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 25 days.

(21) Appl. No.: 14/165,447

(22) Filed: Jan. 27, 2014

(65) Prior Publication Data

US 2014/0212236 A1 Jul. 31, 2014

(30) Foreign Application Priority Data

Jan. 28, 2013 (DE) .......................... 10 2013 201 328

(51) Int. Cl.
*B23Q 15/14* (2006.01)
*B23Q 17/00* (2006.01)
*B23Q 1/00* (2006.01)
(Continued)

(52) U.S. Cl.
CPC ............ *B23Q 17/002* (2013.01); *B23Q 1/0009* (2013.01); *B23Q 3/12* (2013.01); *B23Q 15/14* (2013.01); *B23Q 17/22* (2013.01); *B23Q 2017/001* (2013.01); *Y10T 409/30084* (2015.01); *Y10T 409/306832* (2015.01); *Y10T 409/309352* (2015.01)

(58) Field of Classification Search
CPC .......... Y10T 409/309352; Y10T 409/309408; Y10T 409/309464; Y10T 409/306832; Y10T 409/306888; Y10T 409/307224; Y10T 409/30728; Y10T 409/308008; Y10T 409/308064; B23Q 15/14; B23Q 15/013; B23Q 16/005; B23Q 2017/001; B23Q 17/002; B23Q 17/003; B23Q 17/005; B23Q 17/0966; B23Q 17/22
USPC ......... 409/186, 187, 193, 194, 207, 208, 231, 409/232, 233
See application file for complete search history.

(56) References Cited

U.S. PATENT DOCUMENTS 2,391,624 A * 12/1945 Heuer ............................ 81/53.2
4,951,578 A * 8/1990 von Haas et al. .............. 409/136
(Continued)

FOREIGN PATENT DOCUMENTS

DE 10105417 A1 * 8/2002
DE 10351347 A1 7/2004
(Continued)

OTHER PUBLICATIONS

English Translation of DE 10105417 A1.*

*Primary Examiner* — Daniel Howell
*Assistant Examiner* — Yasir Diab

(57) ABSTRACT

A machining unit for a program-controlled machine tool having a measuring and monitoring device for monitoring the position and condition of a tool shaft in the tool holder. This measuring and monitoring device includes a plurality of axial sensors and radial sensors and an evaluating unit for the measurement results detected by the sensors. An outer ring is releasably fastened to the spindle housing and contains an electronic transmission element and terminals for energy and data cables. A rotor is assigned to this stationary outer ring and contains the sensors and is coupled to the outer ring for the non-contact data transmission. The rotor is releasably fastened to the front end face of the spindle by bolted connections.

9 Claims, 3 Drawing Sheets

(51) Int. Cl.
  *B23Q 3/12*  (2006.01)
  *B23Q 17/22*  (2006.01)

(56) References Cited

U.S. PATENT DOCUMENTS

| | | | |
|---|---|---|---|
| 5,227,719 A * | 7/1993 | Peterson et al. | 324/174 |
| 7,331,741 B2 * | 2/2008 | Murota et al. | 409/194 |
| 7,473,060 B2 * | 1/2009 | Mohr et al. | 409/233 |
| 7,969,050 B2 * | 6/2011 | Zhang | 310/61 |
| 2004/0028493 A1 * | 2/2004 | Yamamoto | 409/233 |
| 2004/0031619 A1 * | 2/2004 | Lettmann et al. | 174/117 F |
| 2008/0045391 A1 * | 2/2008 | Martens | 483/8 |
| 2010/0188282 A1 * | 7/2010 | Bonerz et al. | 342/146 |

FOREIGN PATENT DOCUMENTS

| | | | |
|---|---|---|---|
| DE | 102006016919 A1 * | 10/2007 | |
| EP | 2272627 A1 * | 1/2011 | |

* cited by examiner

MACHINING UNIT FOR A PROGRAM-CONTROLLED MACHINE TOOL

FIELD OF INVENTION

The invention embodiments relate to a machining unit for a program-controlled machine tool, and more particularly to such a machining unit having a measuring device on the work spindle for monitoring the position and condition of a tool shaft inserted in the tool holder, wherein the measuring device has a plurality of sensors and an evaluating unit for the measurement results of the sensors.

BACKGROUND OF THE INVENTION

The individual and also serial machining of workplaces in modern cutting machine tools calls for maximum accuracies and the strict observance of closest tolerance ranges. In order to achieve and observe these high specifications, the components involved in the machining process, that is, the workpieces including their workpiece carriers (pallets) and also the tools including their tool holders and the work spindles, must be positioned and locked with high precision. The chips which are produced during the machining operation by the tool and which fly around in the work area and deposit on the components are of special significance. Particular problems will result when chips and other contaminations stick to the usually finished surface pairs of tool cone and tool holder or the front-side plane surfaces, or both, and these accumulated chips are pressed in firmly when the tool is exchanged the next time. Since the clamping forces applied to the tool shafts by the clamping devices of the work spindle can reach extremely high values, chips clamped between the inner wall of the tool holder and the outer wall of the tool shaft cause minor deformations of the spindle head, which can be the reason why the tool runs out of true and can be the cause of other faulty machining operations.

In addition, similar problems may occur when the finished plane surfaces have minor defects or also chip deposits on the front side of the tool holder, which can be made as full areas or also subareas. When the tool shaft is pulled into the spindle, the accumulated chips or other deposits are located between the two superfinished plane surfaces. As a result, the tool axis is tilted or offset with respect to the spindle central axis by small amounts, thus causing the tool to run out of true during the machining operation. The resulting defects on the machined tool can often only be determined by complex measurements of the entire tool, which requires a considerable technical effort and also involves the striking risk of producing considerable amounts of rejects.

Systems are already used by means of which the occurrence of imbalance phenomena can be detected on the tool as such, or also on the work spindle, to then take measures for avoiding or balancing, or both, the imbalance phenomena. They can consist in another tool replacement, for example, wherein the then exposed tool shaft and also the tool holder in the spindle can be cleaned by hand or also by a blowing-out operation. However, in order to carry out these operations, the work spindle must be accelerated and optionally be decelerated again only for the purpose of monitoring, thus requiring additional time and work.

The deformations of the tool holder, which are caused by compressed chips, and the resulting wobble movements of the tool holder, or also the spindle head, can be detected by optical systems as well, for example, by means of laser beams, the measurement data of which are prepared in electro-optical evaluating elements and supplied to the machine control.

EP 1 889 685 A discloses a machining unit for program-controlled cutting machine tools, the machining unit including a spindle housing which can be moved along the machine column and has a work spindle rotatably mounted therein. A collet which is axially movable in central fashion in the work spindle interior serves for clamping and releasing a supplied tool shaft in a tool holder on the front end of the work spindle. A monitoring device serves for controlling the spindle head shape and contains at least one measuring unit which already responds to minimal positional deviations that are caused, for example, by the deposit of chips on the respectively finished surface pairing of tool shaft and tool holder. The measuring device can contain mechanized, electric, electromechanical, acoustic, or optically acting sensors which detect the shape of the spindle head with always high measurement accuracy and the output data of which is processed in the evaluating unit. In this way, it is, for example, possible to detect a faulty positioning caused by deposited chips directly after the respective clamping operation of the tool without the work spindle having to be driven. The evaluating unit initiates via the machine control another exchange operation of the tool and a cleaning of the clamping surfaces, for example, by a blowing-out step. The measuring device used in this machining unit only detects deformations of the spindle head in the circumferential direction since the employed sensors detect the cylindrical lateral surface of the cylinder head and the shape deviations thereof.

Furthermore, DE 103 51 347 A discloses a measuring and monitoring apparatus for machine tools, which in a spindle housing movable along the machine column includes a work spindle rotatably mounted therein. Clamping elements in the work spindle interior serve for clamping and releasing an exchangeably fitted tool shaft in a tool holder. In order to ensure an accurate planar abutment of the tool shaft against the tool holder, an annular flange is mounted on the spindle head and has a plurality of equidistantly arranged finished subareas on the front face thereof. A sensor is attributed to each of these subareas and is connected to transmission elements for the measurement data transmission via inner connecting lines. The sensors and measuring elements only detect axial deformations which occur on the annular mating surface of the spindle head in the case of a non-flat abutment of the contact surface formed on the tool shaft. The energy and data lines extend in the respective components, that is, they are integrated therein. A limitation of this known measuring and monitoring system is that the sensor system and also the evaluating unit are made as a modular unit with the work spindle and can only be installed and removed together with the work spindle. This means in practice that a major maintenance and repair effort is necessary if malfunctions occur in the sensor system, that is, if one or also several sensors fail or the connections thereof are interrupted, or both.

SUMMARY OF EMBODIMENTS OF THE INVENTION

A purpose of the invention embodiments disclosed herein is to provide a machining unit of the above mentioned type, wherein the maintenance and repair of the measuring and monitoring device allows the separate determination of changes in the form of the milling head in the circumferential direction and additionally also deviations of the coaxial orientation of the tool axis with respect to the spindle axis. Further, the effort regarding the installation and removal of the measuring and monitoring apparatus in the work spindle is simplified compared with known apparatus.

Improved measuring accuracy is achieved by the use of two different sensor types which act as "axial" sensors on the one hand, and as "radial" sensors on the other hand. The "axial" sensors detect the axial pressure applied to the mating surface of the spindle head by the abutment ring of the tool shaft, that pressure being generated by the forces of the activated collet. Since in each case a plurality of sensors is arranged on the ring wheel-shaped contact surface of the spindle head so as to be distributed over the circumferential surface thereof, it is possible to detect a non-uniform distribution of the contact pressures over the circumference and the resulting tilting of the tool axis with respect to the spindle axis. Such phenomena are usually caused by chips deposited on the surface pairing.

The second sensor type which may consist of several "radial" sensors can detect the deformation of the outer circumference of the spindle head which is caused by foreign matter and chips between the conical surfaces of tool holder and tool shaft. Such factors can result in minimal deformations of the spindle head in radial and circumferential directions when the tool shaft is pulled in the tool holder.

According to embodiments of the invention, the sensors and the electronic evaluating unit are accommodated in an annular body which is releasably fastened to the front end of the work spindle, for example, by a plurality of axial stud bolts. This annular body contains transmission means for the non-contact transmission of measurement data and energy. To this end, an induction coil can be accommodated in the annular body. According to the invention, this annual body is surrounded by a stationary outer ring which is releasably fastened to the front end of the spindle housing, for example, by axial stud bolts. Further transmission means are provided in this outer ring, for example, in the form of a coil, and communicate with the transmission means of the inner annular body acting as a rotor. Moreover, cable connections for the energy and data cables are provided externally on the annular body. The energy and data cables run in an externally open longitudinal channel in the spindle housing, which may be covered by sheets or other protective elements.

An advantage of this concept is that the outer ring and also the inner annular body can be removed and installed in an easy and fast way separately or also jointly. As opposed to this, it was formerly necessary to remove the entire spindle from the machine in the case of malfunctions of the measuring system, which always involved considerable effort.

BRIEF DESCRIPTION OF THE DRAWING

The objects, advantages, and features of the embodiments of the invention will be more clearly perceived from the following detailed description, when read in conjunction with the accompanying drawing, in which.

DETAILED DESCRIPTION OF EMBODIMENTS OF THE INVENTION

Figure 1:
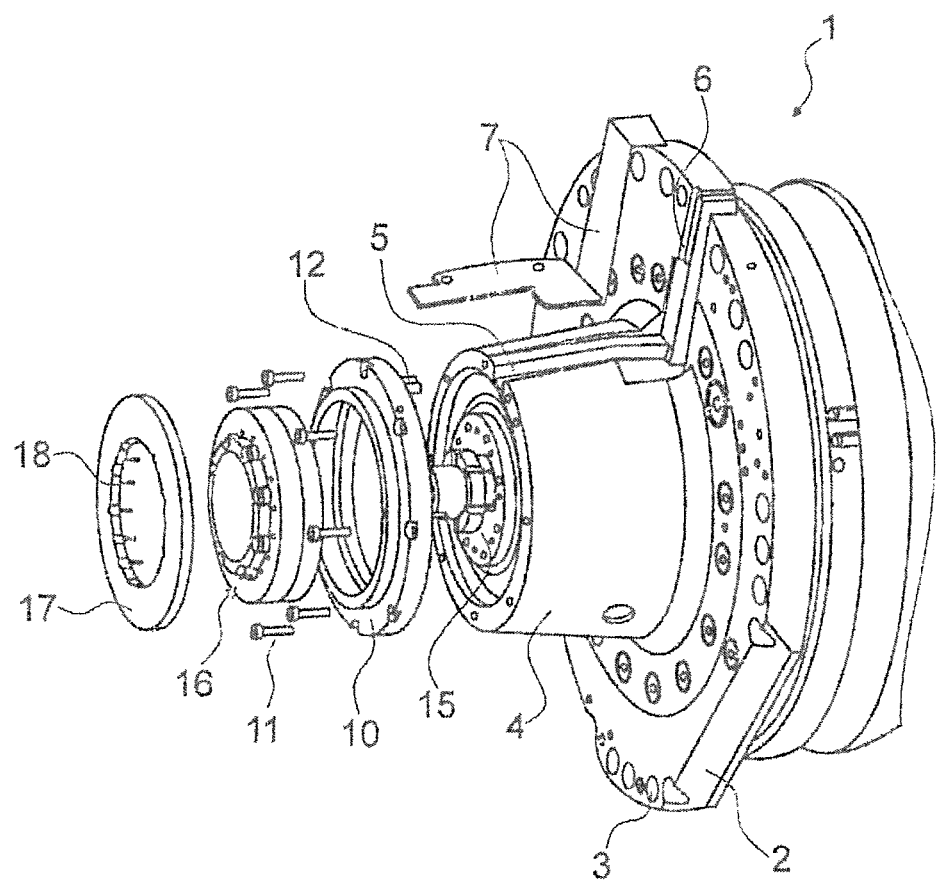
FIG. 1 is a machining unit including a work spindle and a measuring device in accordance with embodiments of the invention in a perspective, partially exploded view.

The machining unit shown in the drawing serves for carrying out milling and drilling work on workpieces by means of tools (not shown) which are clamped in the work spindle.

The machining unit has a housing 1, which is attached to or assembled with the predetermined component of the machine tool, namely by means of annular flange 2, which contains a plurality of axial bores 3. Frustoconical housing part 4, in the form of a truncated cone, is mounted on the front side of this annular flange, and at least one externally open longitudinal groove 5 is incorporated in the circumferential wall thereof. This longitudinal groove is a continuation in the form of receiving groove 6 which is formed in flange 2. Longitudinal groove 5 and continuation 6 thereof form a receiving channel for an energy and measurement data cable 20 (FIG. 2), which is laid in this channel 5, 6 and may then be covered by profiled sheet 7 releasably fastened to truncated cone 4.

The machining unit shown in FIG. 1 includes ring 10 having a profiled cross-section in front of the front end of truncated cone 4. Ring 10 is releasably fastened to the front side of the truncated cone by a plurality of stud bolts 11. This outer ring 10 has a profiled cross-section and is supported via its front face found on the right-hand side in FIG. 1 on the left annular front face of the truncated cone. Transmission means are accommodated in this outer ring and serve for the non-contact transmission of measurement data and energy signals (see FIGS. 2a, b). Furthermore, cable outlet 12 for the sensor system is provided on outer ring 10, is arranged oppositely to cable channel 5, and protrudes slightly into the cable channel when installed.

Work spindle 15, which is shown here as a conventional milling spindle, is rotatably mounted in the housing and thus also in truncated cone 4. Annular rotor 16 is releasably fastened to the front end of this work spindle by means of a plurality of stud bolts and is rotated jointly with the work spindle so as to constitute a rotor. Radial and axial sensors 16a, 16b are accommodated in rotor 16 and serve for detecting operational deformations of the spindle or the spindle head, or both, in axial and also circumferential directions. Different types of sensors, for example, pressure-, stress-, or force-sensitive sensors, constitute part of a sensor system and are suitable as measurement sensors to detect misalignments of the spindle or changes in shape, or both. The sensor system contains an evaluating device which is electronically coupled to the different sensors, evaluates and also stores the detected data and can be controlled by a microprocessor. The wear values of the cutting tools and possible damage of machine components by means of impact collision can also be detected by means of the sensor system, can be stored and can be taken into appropriate consideration for the machine control.

Rotor ring 16 has a smooth and cylindrical inner circumferential surface and a stepped cross-section (see FIG. 2). This annular rotor is covered, by an annular disk 17 which is releasably fastened to the flat end face of the spindle by means of stud bolts 18 in the case of a planar abutment and concludes the work spindle on the front side, sparing the tool holder for clamping the tool shaft.

Figure 2A:
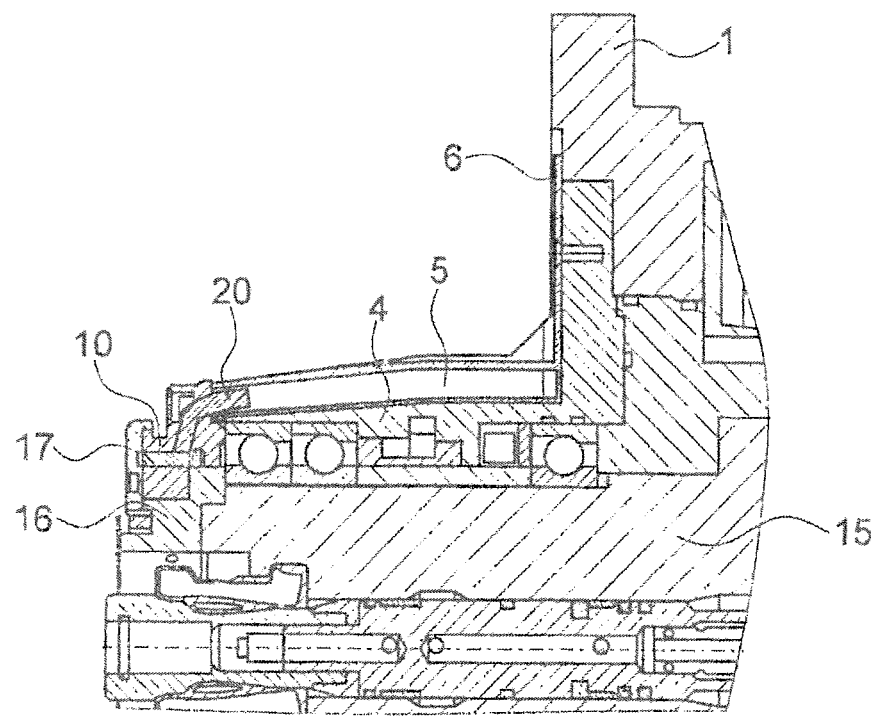
FIG. 2a is an axial sectional view of the machining unit shown in FIG. 1.
Figure 2B:
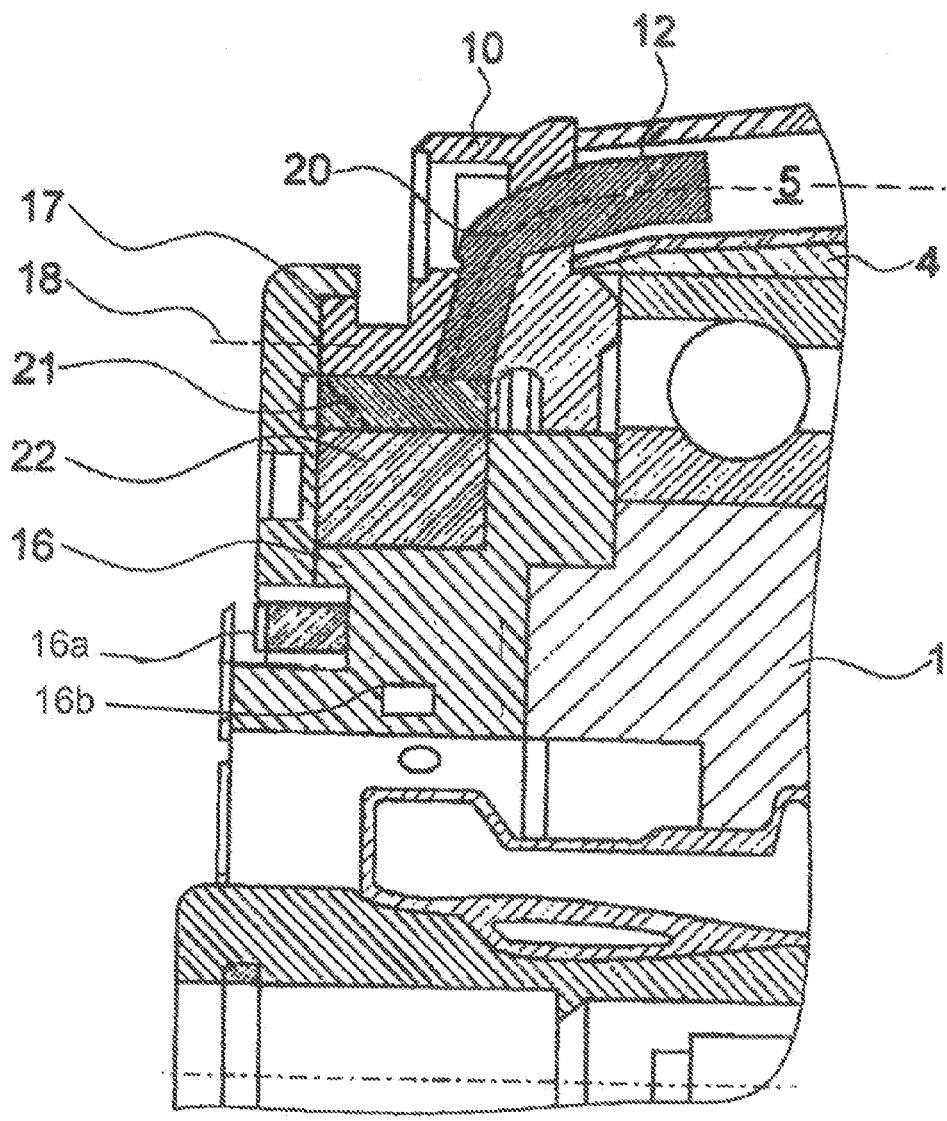
FIG. 2b shows a portion of the machining unit sectional view of FIG. 2a on an enlarged scale.

As is evident from FIGS. 2a, 2b, cable 20 laid in cable channel 5 of the spindle housing extends into stationary outer ring 10, which is firmly connected to spindle housing 4 by means of stud bolts 11. Cable outlet or terminal 12 for the energy and measurement data cable 20 are disposed in outer ring 10, wherein measurement cable 20 is also connected to transmission element 21 arranged in stationary outer ring 10 in the way shown in FIG. 2b and the mating element 22 thereof is located in rotor ring 16 rotating with the spindle.

The present concept is not limited to the exemplary embodiments as shown but also covers variants. For example, the evaluating unit can be integrated functionally and also by way of design in the inner ring, that is, rotor 16. However, the evaluating unit can also be arranged outside in an outer component of the spindle or spindle housing and can be connected to the sensor system via cable 20.

What is claimed is:

1. A machining unit for a program-controlled machine tool having control electronics, a spindle housing, a work spindle rotatably mounted in said spindle housing and including a rotary drive, a tool support in said work spindle, said tool support including clamping devices for the releasable positioning of a tool shaft in a tool holder, the machining unit comprising:
   a measuring device for monitoring the position and condition of a tool shaft in the tool holder, said measuring device comprising:
      an outer ring releasably mounted to said spindle housing;
      an annular rotor releasably mounted to said work spindle;
      a sensor system comprising axial and radial sensors on said annular rotor, said sensors having sensing measurements results; and
      an electric evaluating unit coupled to said sensors for receiving and evaluating the measurement results from said sensors.

2. The machining unit according to claim 1, wherein said axial and radial sensors of said sensor system are connected to the control electronics of the machine tool via non-contact transmission means by at least one externally accessible and releasable cable.

3. The machining unit according to claim 2, wherein said cable comprises energy and data lines laid in an externally accessible cable channel on said spindle housing and releasably connected to the controlled electronics.

4. The machining unit according to claim 2, wherein said spindle housing accommodates axial grooves as cable channels for receiving energy and data lines of said cable which cable channels can be closed by releasably fastened cover sheets.

5. The machining unit according to claim 3, wherein said spindle housing accommodates axial grooves as cable channels for receiving energy and data lines of said cable which cable channels can be closed by releasably fastened cover sheets.

6. The machining unit according to claim 1, wherein said axial sensors are carried on a front side of said annular rotor and said radial sensors are mounted along the periphery of said annular rotor.

7. The machining unit according to claim 2, wherein said axial sensors are carried on a front side of said annular rotor and said radial sensors are mounted along the periphery of said annular rotor.

8. The machining unit according to claim 1, wherein said annular rotor is releasably fastened to the front end portion of said work spindle by axial stud bolts.

9. A measuring device for monitoring the position and condition of a tool shaft in it tool holder of a machining unit for a program-controlled machine tool having control electronics, a spindle housing, a work spindle rotatably mounted in said spindle housing and including a rotary drive, a tool support in said work spindle, said tool support including clamping devices for the releasable positioning of the tool shaft in the tool holder, the measuring device comprising:
   an outer ring releasably mountable to said spindle housing;
   an annular rotor releasably mountable to said work spindle;
   a sensor system comprising axial and radial sensors on said annular rotor, said sensors having sensing measurement results; and
   an electronic evaluating unit coupled to said sensors for receiving and evaluating the measurement results from said sensors.

* * * * *